US006542481B2

(12) United States Patent
Foore et al.

(10) Patent No.: US 6,542,481 B2
(45) Date of Patent: Apr. 1, 2003

(54) DYNAMIC BANDWIDTH ALLOCATION FOR MULTIPLE ACCESS COMMUNICATION USING SESSION QUEUES

(75) Inventors: Lawrence R. Foore, Palm Bay, FL (US); James A. Proctor, Jr., Indialantic, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 78 days.

(21) Appl. No.: 09/773,252

(22) Filed: Jan. 31, 2001

(65) Prior Publication Data

US 2001/0021197 A1 Sep. 13, 2001

Related U.S. Application Data

(63) Continuation-in-part of application No. 09/088,527, filed on Jun. 1, 1998, now Pat. No. 6,388,999.

(51) Int. Cl.[7] ............................. H04L 12/28; H04J 3/16
(52) U.S. Cl. ...................... 370/329; 370/412; 370/468; 455/450
(58) Field of Search ................................. 370/328, 329, 370/334, 338, 341, 348, 352, 355, 468, 412, 469, 431, 437, 449, 521; 455/450, 452, 509, 560, 561

(56) References Cited

U.S. PATENT DOCUMENTS

| 4,675,863 A | 6/1987 | Paneth et al. ................. 370/50 |
| 4,817,089 A | 3/1989 | Paneth et al. ................. 370/95 |
| 4,912,705 A | 3/1990 | Paneth et al. ............... 370/95.1 |

(List continued on next page.)

FOREIGN PATENT DOCUMENTS

| EP | 0526106 | 2/1993 | ........... H04Q/11/04 |
| EP | 0682423 | 11/1995 | ........... H04J/13/00 |
| EP | 0719062 | 6/1996 | ........... H04Q/7/36 |
| WO | 97/46044 | 12/1992 | ........... H04Q/7/38 |
| WO | 96/08934 | 3/1996 | ........... H04Q/7/22 |
| WO | 96/37081 | 11/1996 | ........... H04Q/7/24 |
| WO | 97/23073 | 6/1997 | ............. H04J/3/16 |

OTHER PUBLICATIONS

Melanchuk et al., *CDPD and Emerging Digital Cellular Systems*, Digest of Papers of COMPCON, Computer Society Conference 1996, Technologies for the Information Superhighway, Santa Clara, CA, No. Conf. 41, Feb. 25, 1996, pp. 2–8, XP000628458, Institute of Electrical and Electronics Engineers.

Primary Examiner—Alpus H. Hsu
Assistant Examiner—Afsar M. Qureshi
(74) Attorney, Agent, or Firm—Allen, Dyer, Doppelt, Milbrath & Gilchrist, P.A.

(57) ABSTRACT

A technique for providing high speed data service over standard wireless connections via an unique integration of protocols and existing cellular signaling, such as is available with Code Division Multiple Access (CDMA) type systems through more efficient allocation of access to CDMA channels. For example, when more users exist than channels, the invention determines a set of probabilities for which users will require channel access at which times, and dynamically assigns channel resources accordingly. Channel resources are allocated according to a buffer monitoring scheme provided on forward and reverse links between a base station and multiple subscriber units. Each buffer is monitored over time for threshold levels of data to be transmitted in that buffer. For each buffer, a probability is calculated that indicates how often the specific buffer will need to transmit data and how much data will be transmitted. This probability takes into account the arrival rates of data into the buffer, as well as which thresholds within the buffer are exceeded, as well as which resources in the form of channels are already allocated to the subscriber unit.

29 Claims, 5 Drawing Sheets

U.S. PATENT DOCUMENTS

| | | | |
|---|---|---|---|
| 5,022,024 A | 6/1991 | Paneth et al. | 370/50 |
| 5,114,375 A | 5/1992 | Wellhausen et al. | 446/246 |
| 5,268,900 A * | 12/1993 | Hluchyj et al. | 370/355 |
| 5,282,222 A | 1/1994 | Fattouche et al. | 375/1 |
| 5,325,419 A | 6/1994 | Connolly et al. | 379/60 |
| 5,412,429 A | 5/1995 | Glover | 348/398 |
| 5,463,629 A | 10/1995 | Ko | |
| 5,585,850 A | 12/1996 | Schwaller | 348/388 |
| 5,617,423 A | 4/1997 | Li et al. | 370/426 |
| 5,655,001 A | 8/1997 | Cline et al. | 370/328 |
| 5,657,358 A | 8/1997 | Panech et al. | 375/356 |
| 5,687,194 A | 11/1997 | Paneth et al. | 375/283 |
| 5,697,059 A | 12/1997 | Carney | 455/34.1 |
| 5,859,879 A | 1/1999 | Bolgiano et al. | 375/347 |
| 6,052,385 A | 4/2000 | Kanerva et al. | 370/468 |
| 6,097,733 A * | 8/2000 | Basu et al. | 370/468 |
| 6,111,863 A * | 8/2000 | Rostoker et al. | 370/468 |
| 6,198,723 B1 * | 3/2001 | Parruck et al. | 370/412 |
| 6,370,117 B1 * | 4/2002 | Koraitim et al. | 370/232 |

* cited by examiner

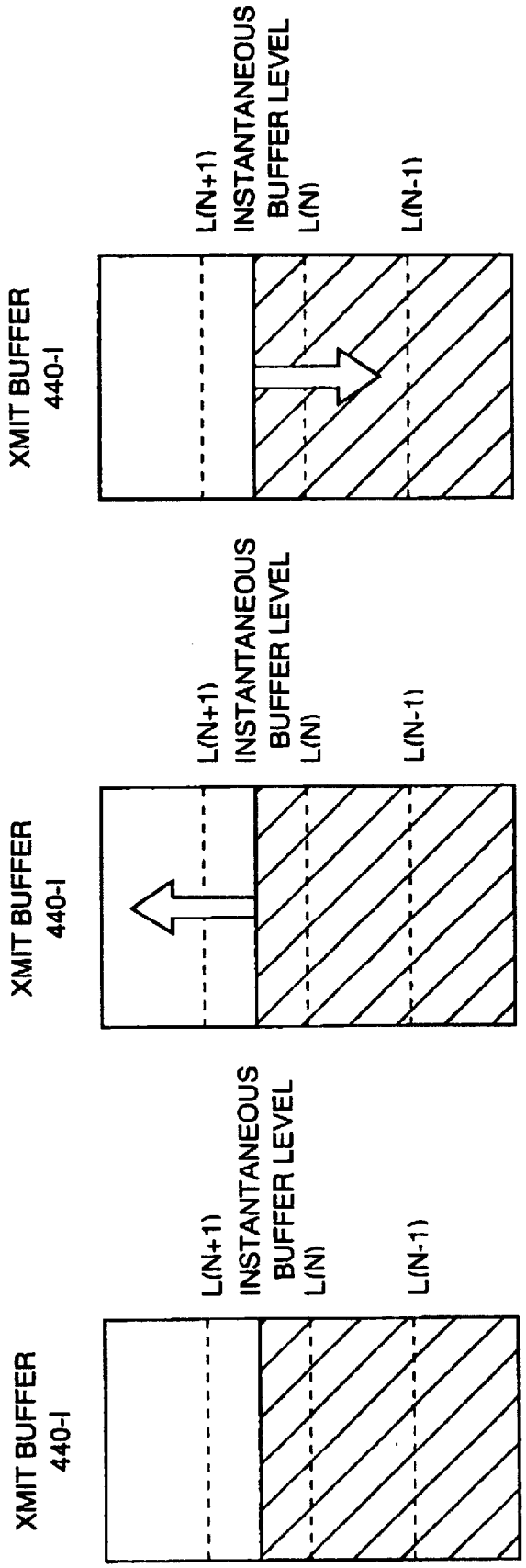

DYNAMIC BANDWIDTH ALLOCATION FOR MULTIPLE ACCESS COMMUNICATION USING SESSION QUEUES

RELATED APPLICATION(S)

This application is a continuation-in-part of a prior U.S. patent application Ser. No. 09/088,527 filed Jun. 1, 1998, U.S. Pat. No. 6,388,999, entitled "Dynamic Bandwidth Allocation for Multiple Access Communications Using Buffer Urgency Factor". The entire teachings of the above application is incorporated herein by reference.

BACKGROUND OF THE INVENTION

The increasing use of wireless telephones and personal computers has led to a corresponding demand for advanced telecommunication services that were once thought to only be used in specialized applications. In the 1980's, wireless voice communication became widely available through the cellular telephone network. Such services were at first typically considered to be the exclusive province of the businessman because of expected high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet, private intranets, and other networks using the existing wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets. Furthermore, the existing cellular network was originally designed only to deliver voice services. As a result, the emphasis in present day digital wireless communication protocols and modulation schemes lies with voice, although certain schemes such as do provide some measure of asymmetrical behavior for the accommodation of data transmission. For example, the data rate on an IS-95 forward traffic channel can be adjusted in increments from 1.2 kilobits per second (kbps) up to 9.6 kbps for so-called Rate Set 1 and in for increments from 1.8 kbps up to 14.4 kbps for Rate Set 2. On the reverse link traffic channel, however, the data rate is fixed at 4.8 kbps.

The design of such existing systems therefore typically provides a radio channel which can accommodate maximum data rates only in the range of 14.4 kilobits per second (kbps) at best in the forward direction. Such a low data rate channel does not lend itself directly to transmitting data at a rate of 56.6 kbps which is now commonly available using inexpensive wire line modems, not to mention even higher rates such as the 128 kbps which is available with Integrated Services Digital Network (ISDN) type equipment. Data rates at these levels are rapidly becoming the minimum acceptable rates for activities such as browsing web pages.

Other types of data networks using higher speed building blocks such as Digital Subscriber Line (xDSL) service are now coming into use in the United States. However, their costs have only been recently reduced to the point where they are attractive to the residential customer.

Although such networks were known at the time that cellular systems were originally deployed, for the most part there is no provision for providing higher speed ISDN- or xDSL-grade data services over cellular network topologies. Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes the permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline medium is relatively inexpensive to obtain, and is therefore not typically intended to be shared.

Other considerations are the characteristics of the data itself. For example, consider that access to web pages in general is burst-oriented, with asymmetrical data rate transmission requirements. In particular, the user of a remote client computer first specifies the address of a web page to a browser program. The browser program then sends this web page address data, which is typically 100 bytes or less in length, over the network to a server computer. The server computer then responds with the content of the requested web page, which may include anywhere from 10 kilobytes to several megabytes of text, image, audio, or even video data. The user then may spend at least several seconds or even several minutes reading the content of the page before requesting that another page be downloaded. Therefore, the required forward channel data rates, that is, from the base station to the subscriber, are typically many times greater than the required reverse channel data rates.

In an office environment, the nature of most employees' computer work habits is typically to check a few web pages and then to do something else for extended period of time, such as to access locally stored data or to even stop using the computer altogether. Therefore, even though such users may expect to remain connected to the Internet or private intranet continuously during an entire day, the actual overall nature of the need to support a required data transfer activity to and from a particular subscriber unit is actually quite sporadic.

Furthermore, prior art wireless communication systems provide a continuous bandwidth to individual subscribers. That is, in such networks, during a communication session the bandwidth available at all times is constant and has been designed, as noted above, primarily for voice grade use.

SUMMARY OF THE INVENTION

Prior art methodologies for transmission of data over wireless networks suffer numerous problems. As noted above, the bandwidth available for a single subscriber unit channel is typically fixed in size. However, data communications tend to be bursty in nature, often requiring a need for large amounts of bandwidth at certain times, while requiring very little amounts, or even none, at other times. These wide swings in bandwidth requirements can occur very close together in time.

For example, when browsing a web site using HyperText Transfer Protocol (HTTP), the user typically selects pages by selecting or clicking a single link to a page causing the client computer to send a small page request packet to the web server. The request packet in the receive link direction requires very little bandwidth. In response to the request, the server typically delivers one or more web pages ranging in size from 10 to 100 kilobits (kB) or more to the client in the forward link direction. To receive the pages, the bandwidth requirements are much greater than to request the pages. The optimum bandwidth needed to acceptably receive the pages is rarely realized due to the inefficiency of the present wireless protocols that only offer maximum data rates of about 9600 bps under optimal conditions. This results in the server having to hold back some of the requested data until the network can "catch up" with the data delivery and also results in frustrated users having slow response and page loading times. In essence, the bandwidth to send a request is more than is needed, and the bandwidth to receive the pages is not enough to deliver the data at acceptable rates.

Another problem with prior art systems is that the difference between the time which the page request message leaves the wireless network and becomes wirebound, and the time when the pages of requested data enter the wireless portion of the data communications session is often quite long. This time-from-request to time-of-receipt delay is a function of how congested the network and the server are.

The present invention is based in part on the observation that bandwidth is being wasted during periods of time when waiting for data from the wireline network. Prior art wireless communications systems maintain the constant availability of the full bandwidth of the 9600 bps wireless connection for that entire data communication session, even though the wireless client may be waiting for return pages. This bandwidth which is effectively unused is therefore wasted because there is no way to allocate the channel resources in use for this data communication session to another session needing more bandwidth. That is, if other concurrent wireless data communications sessions are taking place for other subscriber units, these concurrent sessions have no way in the prior art systems to take advantage of any unused bandwidth allocated to the client merely waiting for return pages, as in this example.

The present invention provides high speed data and voice service over standard wireless connections via an unique integration of protocols and existing cellular signaling, such as is available with Code Division Multiple Access (CDMA) type systems. The invention achieves high data rates through more efficient allocation of access to the CDMA channels.

Specifically, the invention provides a scheme for determining an efficient allocation of N fixed rate data channels amongst M users. The invention addresses the problem of how to allocate these channels in the most effective manner between users competing for channel use. For example, when more users exist than channels, the invention determines a set of probabilities for which users will require channel access at which times, and assigns channel resources accordingly. The invention can also dynamically take away or deallocate channels (i.e., bandwidth) from idle subscribers and provide or allocate these freed-up channels to subscribers requiring this bandwidth.

Channel resources are allocated according to a buffer monitoring scheme provided on forward and reverse links between a base station and multiple subscriber units. Data buffers are maintained for each connection between a base station and a subscriber unit. Each buffer is monitored over time for threshold levels of data to be transmitted in that buffer. In essence, the thresholds measure the "fullness" of buffers over time for each respective subscriber unit are monitored. For each buffer, a probability is calculated that indicates how often that a specific buffer for a specific subscriber will need to transmit data and how much data will be transmitted. This probability takes into account the arrival rates of data into the buffer, as well as which thresholds within the buffer are exceeded, as well as which resources in the form of channels are already allocated to the subscriber unit. Based on this probability, channel resources for data transmission can be either allocated or deallocated to subscriber units depending upon a forecasted need.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a buffer level diagram.

FIG. 6 is a buffer level diagram when resources are being added.

FIG. 7 is a buffer level diagram when resources are being taken away.

DETAILED DESCRIPTION OF A PREFERRED EMBODIMENT

Figure 1:
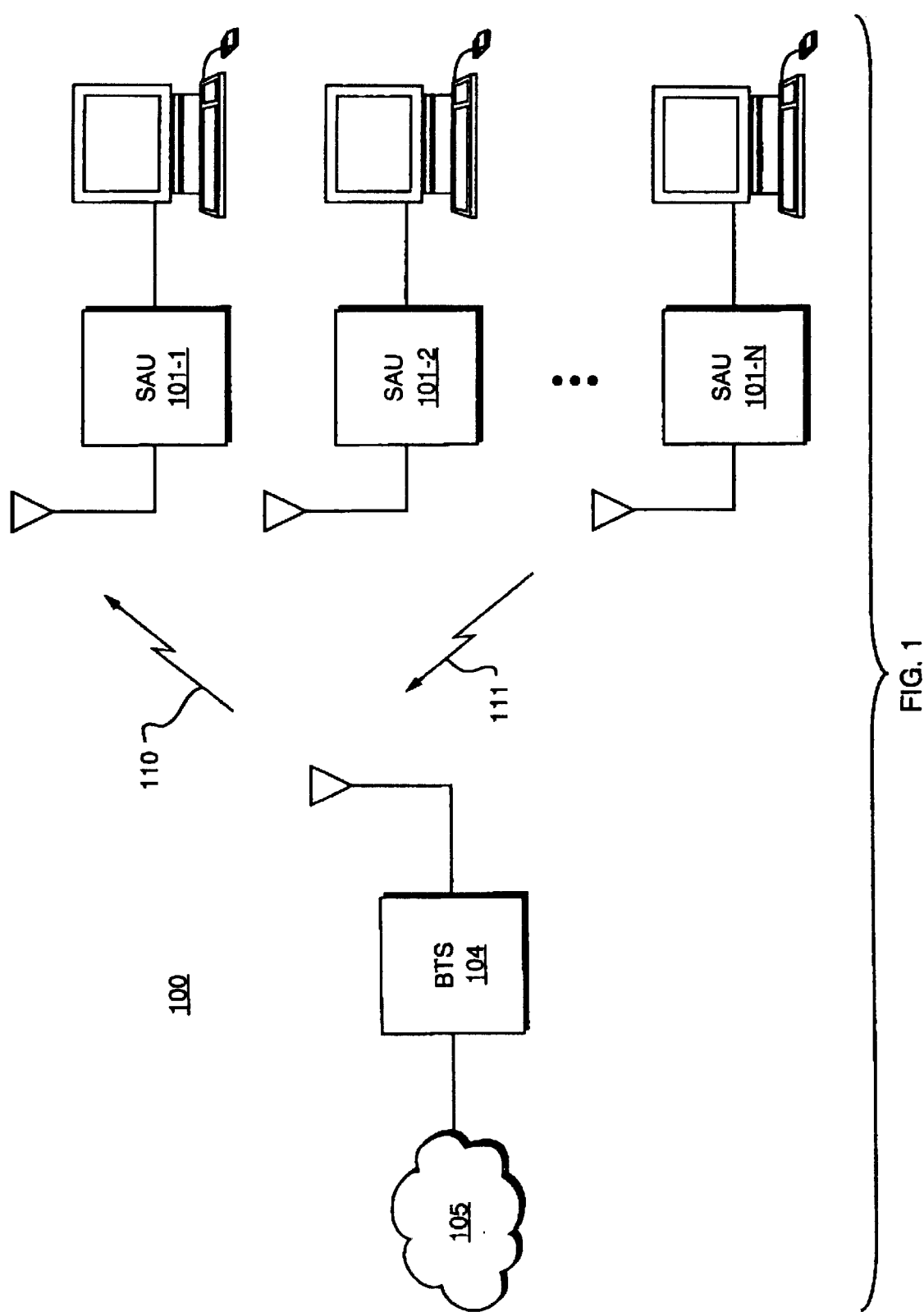
FIG. 1 is a block diagram of an example wireless communication system making use of a bandwidth management scheme according to the invention.

Turning attention now to the drawings more particularly, FIG. 1 is a block diagram of a system 100 for providing high speed data service over a wireless connection by seamlessly integrating a wired digital data protocol such as, for example, Transmission Control Protocol/Internet Protocol (TCP/IP) with a digitally modulated wireless service such as Code Division Multiple Access (CDMA).

The system 100 consists of two different types of components, including subscriber units 101-1, 101-2, . . ., 101-n (collectively subscribers 101) as well as one or more base stations 104 to provide the functions necessary in order to achieve the desired implementation of the invention. The subscriber units 101 provide wireless data and/or voice services and can connect devices such as, for example, laptop computers, portable computers, personal digital assistants (PDAs) or the like through base station 104 to a network 105 which can be a Public Switched Telephone Network (PSTN), a packet switched computer network, or other data network such as the Internet or a private intranet. The base station 104 may communicate with the network 105 over any number of different efficient communication protocols such as primary rate ISDN, or other LAPD based protocols such as IS-634 or V5.2, or even TCP/IP if network 105 is an Ethernet network such as the Internet. The subscriber units 101 may be mobile in nature and may travel from one location to another while communicating with base station 104.

FIG. 1 illustrates one base station 104 and three mobile subscriber units 101 by way of example only and for ease of description of the invention. The invention is applicable to systems in which there are typically many more subscriber units 101 communicating with one or more base stations 104.

It is also to be understood by those skilled in the art that FIG. 1 may be a standard cellular type communication system such as a CDMA, TDMA, GSM or other system in which the radio channels are assigned to carry between the base stations 104 and subscriber units 101. This invention, however, applies more particularly to non-voice transmissions, and preferably to digital data transmissions of varying bandwidths. Thus, in a preferred embodiment, FIG. 1 is a CDMA-like system, using code division multiplexing principles for the air interface. However, it is also to be understood that the invention is not limited to using standardized CDMA protocols such as IS-95, or the newer emerging CDMA protocol referred to as IS-95B. The invention is also applicable to other multiple access techniques.

In order to provide data and voice communications between the subscriber units 101 and base station 104, wireless transmission of data over a limited number of radio channel resources is provided via forward communication channels 110 which carry information from the base station 104 to the subscriber units 101, and reverse communication channels 111 which carry information from the subscriber units 101 to the base station 104. The invention provides dynamic bandwidth management of these limited channel resources on an as needed basis for each subscriber unit 101. It should also be understood that data signals travel bidirectionally across the CDMA radio channels 110 and 111, i.e., data signals originating at the subscriber units 101 are coupled to the network 105, and data signals received from the network 105 are coupled to the subscriber units 101.

Figure 2:
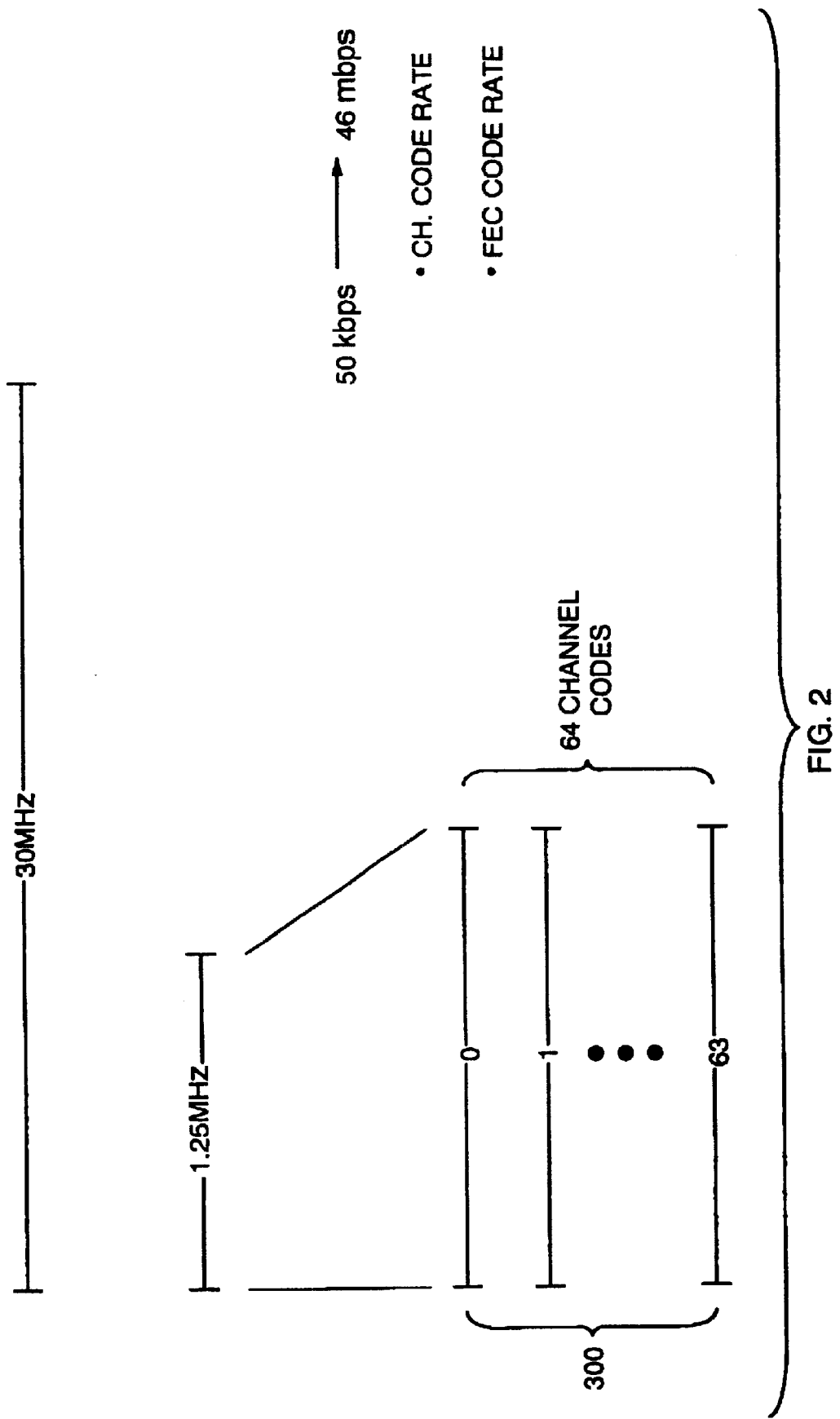
FIG. 2 is a diagram showing how channels are assigned within a given radio frequency (RF) channel.

FIG. 2 provides an example of how dynamic allocation of radio bandwidth may take place in system 100. First a typical transceiver within a subscriber unit 101 or the base station 104 can be tuned on command to any 1.25 MegaHertz (MHz) channel within a much larger bandwidth, such as up to 30 MHz in the case of the radio spectrum allocated to cellular telephony. This bandwidth is typically made available in the range of from 800 to 900 MHz in the United States. For PCS type wireless systems, a 5 or 10 MHz bandwidth is typically allocated in the range from about 1.8 to 2.0 GigaHertz (GHz). In addition, there are typically two matching bands active simultaneously, separated by a guard band, such as 80 MHz; the two matching bands form a forward and reverse full duplex link between the base station 104 and the subscriber units 101.

Within the subscriber unit 101 and the base station 104 transmission processors (i.e., transceivers) are capable of being tuned at any given point in time to a given 1.25 MHz radio frequency channel. It is generally understood that such 1.25 MHz radio frequency carrier provides, at best, a total equivalent of about a 500 to 600 kbps maximum data rate transmission speed within acceptable bit error rate limitations. In the prior art, it was thus generally thought that in order to support an XDSL type connection which may contain information at a rate of 128 kbps that, at best, only about (500 kbps/128 kbps) or only three (3) subscriber units 101 could be supported at best on each radio channel.

In contrast to this, the present system 100 subdivides the available radio channel resources into a relatively large number of subchannels and then provides a way to determine how to allocate these subchannels to best transmit data between the base station 104 and each of the subscriber units 101 and vice versa. In the illustrated example in FIG. 2, the bandwidth is allocated to sixty-four (64) subchannels 300. It should be understood herein that within a CDMA type system, the subchannels 300 are physically implemented by encoding a data transmission with one of a number of different pseudorandom (PN) or orthogonal channel codes. For example, the subchannels 300 may be defined within a single CDMA radio frequency (RF) carrier by using different orthogonal codes for each defined subchannel 300. (The subchannels 300 are also referred to as "channels" in the following discussion, and the two terms are used interchangeably from this part onward).

As mentioned above, the channels 300 are allocated only as needed. For example, multiple channels 300 are granted during times when a particular subscriber unit 101 is requesting that large amounts of data be transferred. In the preferred embodiment, the single subscriber unit 101 may be granted as many as 28 of these channels in order to allow data rates of up to about 5 Mega bits per second for an individual subscriber unit 101. These channels 300 are then released during times when the subscriber unit 101 is relatively lightly loaded.

Maximum flexibility can be obtained by adjusting coding rates and modulation types used for each connection, such as the number of channels. One particular scheme for assigning channel codes, Forward Error Correction (FEC) code rate, and symbol modulation types is described in a co-pending U.S. patent application Ser. No. 09/773,253 filed Jan. 31, 2001 entitled "Maximizing Data Rate by Adjusting Code and Coding Rates in CDMA System", given Attorney Docket No. 2479.2021-000 which is assigned to Tantivy Communications, Inc., the same assignee of the present application, which is also hereby incorporated by reference.

Figure 4:
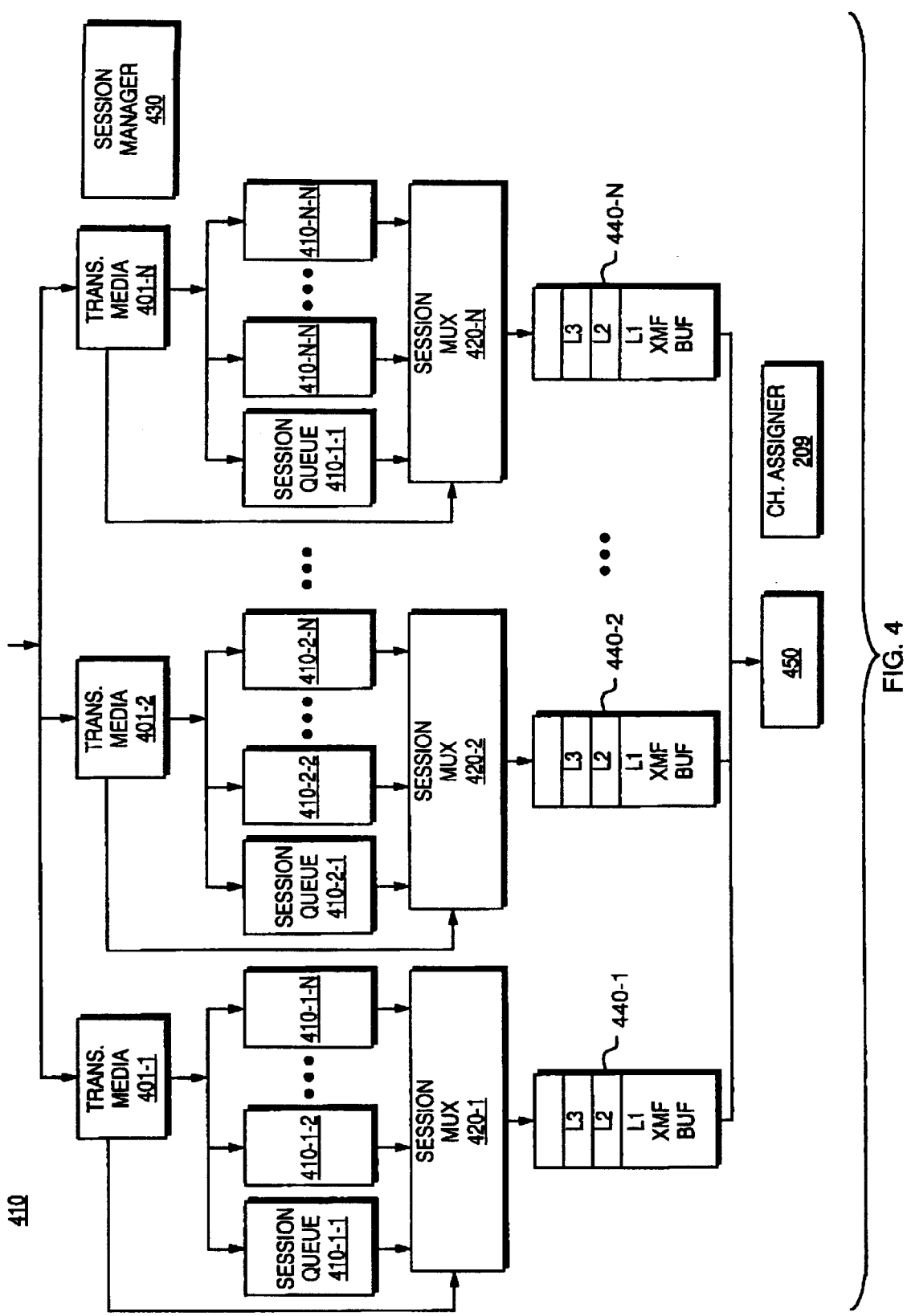
FIG. 4 illustrates the structure of session queues and data buffers used in the base station.

Before discussing how the channels 300 are preferably allocated by the base station 104 referring to FIGS. 1 and 4 the base station 104 establishes and allocates a respective data buffer 440-1 through 440-3. Data buffers 440-1 through 440-3 store the data that is to be transmitted their respective subscriber units 101. That is, in a preferred embodiment, there is a separate data buffer in the base station 104 for each respective subscriber unit 101. As subscriber units enter into and exit out of communication sessions or connections with base station 104 the number of buffers may change. There is always a one-to-one correspondence between the number of buffers 440-1 through 440-3 allocated to the number of subscriber units 101 communicating with base station 104. The buffers 440-1 through 440-3 may be, for example, queues or other memory structures controlled by software, or may be hardware controlled fast cache memory.

The particular process which determines how channels are allocated and deallocated may reside in a data services function disposed within the upper layers of the protocols implemented in the base station 104 and subscriber units 101.

Figure 3:
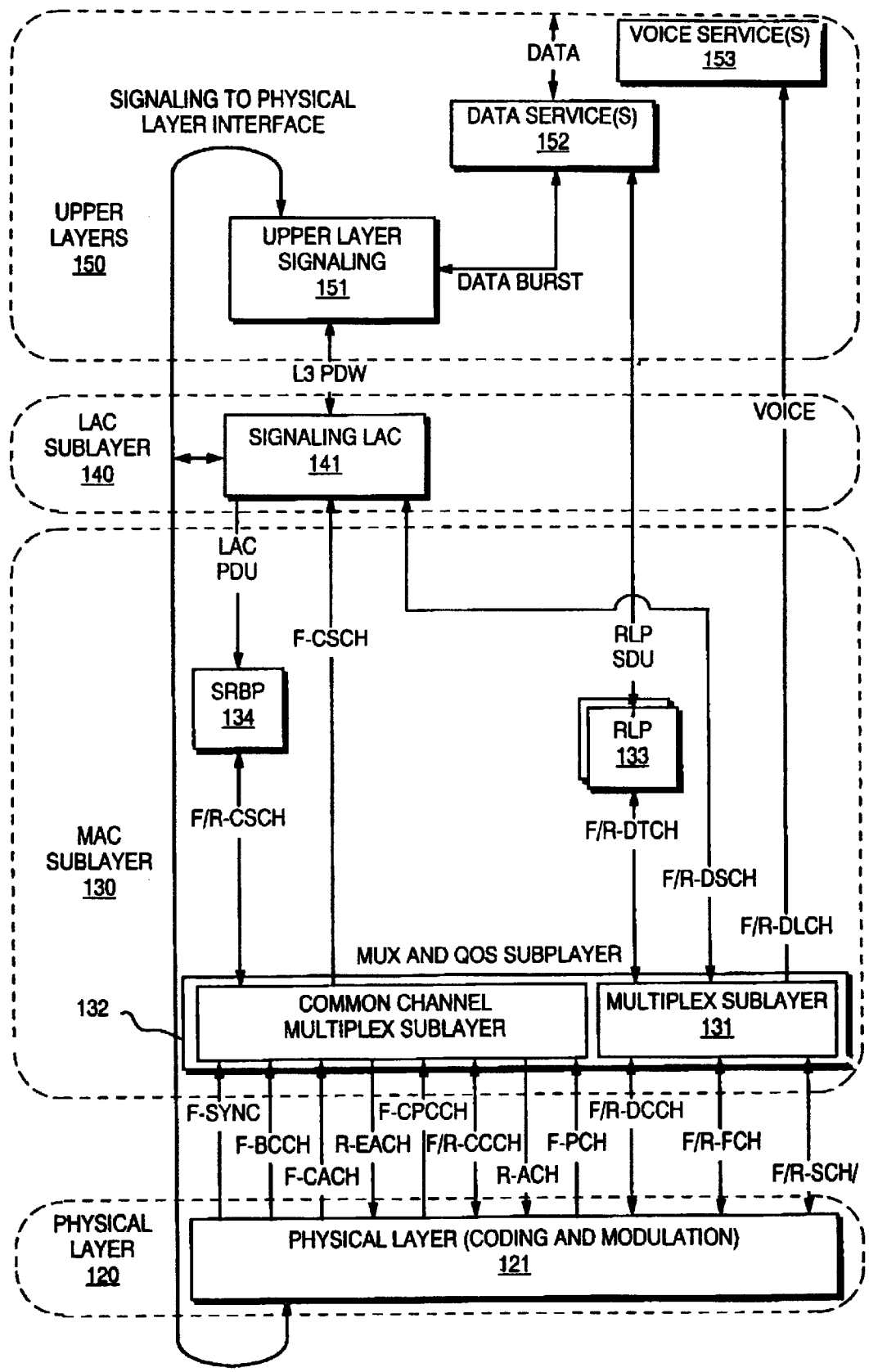
FIG. 3 is a diagram illustrating the protocol layers of a wireless communication system.

Specifically now, referring to FIG. 3, there is shown a protocol layer diagram such as typically associated with third generation (3G) wireless communication services. The protocol layers follow the open system interconnect (OSI) layered model with a physical layer 120 media access control sub layer 130 link access control (LAC) sub layer, 140 and upper communication layers 150. The physical layer 120 provides physical layer of processing such as coding and modulation of the individual logical channels. Access to the logical channels is controlled by the various functions in the MAC sub layer 130 including channel multiplex sub layer 132 multiplex control channel multiplex sub layer 131 radio link protocol sub layer 133 and SRPB 134. The signaling link access control functionality 141 is provided in the LAC sub layer 140.

Upper layers processing 150 includes upper layer signaling 151 data services 152 and voice services 153. The particular decision processes to allocate or deallocate channels to particular network layer connections resides therefore in a data services functionality 152 in the upper layers 150) The data services functionality 152 communicates with the radio link protocol 133 in the MAC sub layer 130 in order to perform functions such as to send messages to allocate and deallocate channels from end to end as demand requires.

Turning attention now to FIG. 4, various components of the base station 104 and subscriber units 101 will be described now in greater detail in connection with the process for determining when channels should be allocated or deallocated.

FIG. 4 is a more detailed diagram of the implementation of the session oriented buffering scheme implemented in the data services function 152. In particular, FIG. 4 shows how this is implemented in the base station 104. Network layer traffic is routed to the base station 104 using typical network routing protocols such as Transmission Control Protocol/Internet Protocol (TCP/IP). At the base station 104 incoming traffic is separated into individual traffic flows destined for separate subscriber units 1-1, 101-2, . . . , 101-n. The traffic flows may be separated such as by examining a destination address field in the TCP/IP header. The individual traffic flows are delivered first to transport modules 401-1, 401-2, . . . , 401-n with a transport module 401 corresponding to each of the intended subscriber units 101. A given transport module 401 is the first step in a chain of processing steps that is performed on the data intended for each subscriber unit 101. This processing chain includes not only the functionality implemented by the transport module 401 but also a number of session queues 410, a session multiplexer 420 and transmission buffers 440. The outputs of the various transmission buffers 440-1, 440-2, . . . , 444-n are then assembled by a transmit processor 450 that formats the data for transmission over the forward radio links 110.

Returning attention now to the top of the FIG. 4 again, each transport module 401 has the responsibility of either monitoring the traffic flow in such a way that it stores data belonging to different transport layer sessions in specific ones of the session queues 410 associated with that transport module 401. For example, transport module 401-1 assigned to handle data intended to be routed to subscriber unit 101-1 has associated with it a number, m, of session queues 410-1-1, 410-1-2, . . . , 410-1-m. In the preferred embodiment, a given session is characterized by a particular transport protocol in use. For example, in a session oriented transport protocol, a session queue 410 is assigned to each session. Such session transport oriented protocols include, for example, Transmission Control Protocol. In sessionless transport protocols, a session queue 410 is preferably assigned to each stream. Such sessionless protocols may for example be the User Datagram Protocol (UDP). Thus traffic destined for a particular subscriber unit 101-1 is not simply routed to the subscriber unit 101-1. First, traffic of different types are from the perspective of the transport layer are first routed to individual session queues 410-1-1, 410-1-2, . . . , 410-1-m, associated with that particular connection.

Another key function performed by the transport module 401-1 is to assign priorities to the individual queues 410-1 associated with it. It will later be understood that depending upon the bandwidth available to a particular subscriber unit 101 traffic of higher priority will be delivered to the transmission buffer 440-1 before those of lower priority. This may include traffic that is not session oriented, for example, real time traffic or streaming protocols that may be carrying voice and/or video information.

More particularly, the transport module 401-1 reports the priorities of each of the individual session queues 410-1 to its associated session multiplexer 420. Traffic of higher priority will be selected by the session multiplexer 420 for loading into the transmit buffer 440-1 for loading traffic of lower priority, in general. Traffic of equal priority will either be fairly selected such as using techniques known as weighted fair queuing (WFQ) or other schemes such as oldest queued data loaded first.

Priorities associated with each session queue may be obtained from information such as a profile data record kept for each user. For example, some users may have specified that they desire web page traffic traveling on TCP type session connections to have lower priority than streaming audio information carried on UDP type connections. Prioritization may also be based on other aspects of the data content being transmitted. For example, traffic being forwarded from a private data network may be given priority over traffic being forwarded from public networks.

Each of the session multiplexers 420-1, 420-2, . . . , 420-n, reports indications to a session manager 430 of the states of all of the session queues 410 that it is currently managing. The session manager 430 also receives indications of the present forward channel assignments given to each individual subscriber unit 101 by the channel assigner 209. The channel assigner 209 monitors the usage of the transmit buffers 440 in the base station. Upon receipt of characteristic information concerning the state of how much data is queued in respect to transmit buffers 440 the channel resource assigner 209 then determines an urgency factor representing the relative need for each subscriber unit 101 to receive data on the available forward link radio channels 110. Using these urgency factors, the channel resource assigner 209 can then dynamically assign an optimum number of channel resources to be allocated to each subscriber unit 101. Specific discussion of urgency factors in the allocation of channels is described in further detail below.

To estimate how much data may be transversing the wired network at any particular instant in time, the session manager 430 also needs to maintain a running estimate of the latency or the back call network 105 to any particular server at the other end of a transport layer session. The transport modules 401 therefore watch individual session flows from various network servers located in the wired network 105 and are therefore capable of estimating latencies such as by determining typical TCP round-trip time estimations. The transport modules 401 report this information to the session manager 430.

The session manager 430 containing all of this information can then send channel requests to the channel resource assigner 209 when it perceives that the present incoming data flow from the wired network for a particular individual subscriber unit 101-1 is greater than the data rate allowed to that subscriber unit by its present channel configuration. Recalled from above that the channel configuration may include the number of channels assigned, coding rate, and symbol modulation rate for each specific channel. Likewise, the session manager 430 notifies the channel resource assigner 209 when it is possible to release channel resources for a particular subscriber unit 101-1 if the incoming data flow from the wired network 105 is less than the maximum data rate that is presently assigned to its forward link.

If split connection transport approaches are employed, as described in RFC 2757-Long Thin Networks, of the Internet Engineering Task Force (EETF), the session manager 430 is capable of sending requests to the transport modules 401 that pause data flow for any particular session or sessions. If the session is a TCP session, the transport modules 401 can then actively place the TCP senders at the other end of the network 105 into a so-called persist mode, thereby pausing all further session flow. If the session is a streaming or unreliable protocol such as UDP, a loss profile will determine the nature of how the queued and incoming data is lost. Session information will be paused or lost if the session manager 430 requests that more forward bandwidth should be assigned to a particular subscriber unit 101-1 and the request denied.

If channel requests are denied, the session manager 430 then determines which session information to regulate, pause, or lose data based on content priority information. As previously mentioned, the transport session managers 401 maintain information to allow them to prioritize their individual session queues 410 based on content so these transport modules 401 can therefore choose the correct session queues to enable and/or disable based on priority.

The transmission buffers 440 are each marked with levels that are used to calculate urgency factors-for each respective buffer 440. The urgency factors are used to determine channel allocation by the channel assigner 209 on a per subscriber per content basis. The levels, indicated in FIG. 4 as L1, L2, and L3, represent demarcation points for channel allocation and/or deallocation. Specifically, when the transmission buffers 440-1 is filling and a level is traversed, an indication is sent to the channel resource assigner 209 that the subscriber unit 101-1 is likely to need more forward link bandwidth assigned. If the request is denied, the channel resource assigner 209 then sends this indication to the session manager 430.

Conversely, when the transmission buffer 440-1 is emptying, and a level is traversed, an indication is sent to the channel resource assigner 209 that the associated subscriber unit 101-1 may have forward traffic channels taken away from or deallocated without affecting end to end performance.

The levels L1, L2, ..., L3, may therefore be termed under flow thresholds. The levels basically represent permetations of available code rate and channel code assignments for an individual subscriber unit 101. Two requirements are needed to determine the threshold levels. First, the route trip transfer time on the wired network either needs to be estimated or initial approximation needs to be set. For TCP sessions, a running round-trip time (RTT) estimation is made. For streaming oriented sessions such as UDP, another approximation can be made which for example may be a function of how much data may be queued to optimize the user's experience for a particular real time application using the UDP protocol.

Secondly, the data rate over the air interface needs to be determined. This is a function of the present code rate (CR) and number of assigned channels (NCH) allocated to a particular subscriber unit. These are the values determined by the channel resource assigner 209.

Coding rates are assigned to subscriber units 101 determined by the quality of the radio connection. For each assigned coding rate, the subscriber may also be assigned a number of channels. One scheme, therefore, allocates a Level to each available assigned channel. Thus levels L1-LC, where C indicates the number of assigned channels are available at any given instant in time to service the connection. Thus the levels, L1-LC, change each time the number of channels are assigned as well as each time the coding rate changes. Specifically, the particular buffer level associated with each L will change depending upon the available coding rate.

A graphical representation of a particular transmit buffer 440 is illustrated in FIG. 5. With knowledge of the round-trip transfer time in the network 105 and the current available data rate over the forward link radio channels 110 allocated to the particular subscriber unit 101 the levels L1-LC may be calculated as follows:

$Ln$=Underflow Threshold=$DR_{Air}$(code rate & channel configuration) * $\Delta t$, where $DR_{air}$ is the data rate across the air interface, and the round-trip transfer time is either the estimated time or the set round-trip time over the wired network 105. $\Delta t$ is the time granularity used to monitor incoming data flows. If this scheme is used only to optimize TCP connection oriented sessions, $\Delta t$ can be said to either the maximum or average of all round-trip times estimated by the TCP end points, depending upon the available buffer space.

The condition for sending a request for more bandwidth to be allocated to a particular subscriber unit 101 is described by the following relationship:

$$\left[ BC_{\Delta t} + \left( \sum_{i=1}^{max} Fin_i * \Delta t \right) \right] > L(n+1)$$

where $\Delta t$ is the time granularity used to monitor the incoming data flows, $BC_\Delta t$ represents the current transmission buffer capacity at the beginning of a particular timeframe, $Fin_1$ minus $Fin_{max}$ represents all incoming data flows from sessions or streams to the transmission buffer 440 and $L(n+1)$ is the amount of data that can be sent over the radio forward links 110 in time $\Delta t$ for the next increasing channel configuration.

Note that for session oriented TCP streams that the maximum $Fin_{Subi}$ is equal to the maximum advertised received window divided by the round-trip transfer time. This condition occurs when the combination of all incoming flows for a specific time interval is greater than the amount of data that can be transmitted during one time interval $\Delta t$ at the next increasing channel capacity assignment.

FIG. 6 represents this case graphically with the block arrow in the Figure representing the amount of flow incoming for the time frame $\Delta t$.

The condition for sending a channel deallocation request for a subscriber unit is given by the relationship:

$$\left[ BC_{\Delta t} + \left( \sum_{i=1}^{max} Fin_i * \Delta t \right) \right] < L(n)$$

where L(n) is the amount of data that can be sent over the assigned forward link channels 110 in time $\Delta t$ for the current channel configuration. This condition occurs when the combination of all incoming flows for a specific time interval, $\Delta t$ is less than the amount of data that can be transmitted during that time interval at the current channel capacity assignment. This situation is represented in the diagram of FIG. 7 with the block arrow representing the amount of flow incoming during time $\Delta t$.

Note that in an actual implementation, the transmission buffers 440 may only be theoretical queues represented by a data structure within the session manager 430 or session multiplexers 420. The transmission buffers 440 are actually the combination of all data residing in all session queues 410 for any particular subscriber unit 101. This same logic applies when determining urgency factors and levels for the transmission buffer data structures namely that such logic can be implemented within the session manager 430 and/or session multiplexers 420 rather than as a separate physical data storage structure and associated logic.

The present invention therefore provides an advantageous way in which transmission queues may be loaded and how additional resources may be requested and/or may be allocated and/or deallocated on a per subscriber basis. Individual transmission queues intended for particular subscribers may therefore be monitored for data level and channels assigned or deassigned depending upon observed buffer filling rates. The channel resource assigner 209 therefore has knowledge of the types of traffic flow through the base station based upon application content. This allows more intelligent efficient channel allocation when there is competition for the available resources. Thus by having transport layer aware channel allocation and deallocation coupled with calculation of overflow and underflow threshold based upon current configured forward link radio channel capacity, the connection between the base station and the subscriber unit in the forward link direction may be optimized.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for allocating and deallocating channel resources from a limited number of channel resources used to transmit data from a base station transmitter within a network comprising a plurality of base station transmitters to a plurality of subscriber unit receivers, the method comprising the steps of:

storing the data to be transmitted to a particular one of the subscriber unit receivers in a plurality of data queues, there being multiple queues associated with each receiver, and with each queue allocated to handle data traffic having a particular traffic type attribute;

accepting data at a transmit processor within the transmitter, the data arriving from the multiple queues for transmission to the particular receiver;

allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver, the urgency determined from the data traffic corresponding to a plurality of the traffic type attributes include content type.

2. A method as in claim 1 wherein each one of the plurality of queues has an associated plurality of thresholds, each threshold associated with the level of data stored in that respective queue.

3. A method as in claim 2 wherein the queue thresholds indicate data underflow.

4. A method as in claim 1 wherein the traffic type attributes also include transport mechanism type.

5. A method as in claim 4 wherein the transport mechanism type is selected from the group consisting of Transmission Control Protocol/Internet Protocol (TCP/IP) and User Datagram Protocol (UDP).

6. A method as in claim 1 wherein the content type is selected from a group consisting of File Transfer Protocol (FTP) and Hyper Text Transfer Protocol (HTTP).

7. A method as in claim 1 wherein the queue thresholds depend upon an expected quality and data rate in the channel.

8. A method as in claim 1 additionally comprising the step of:

computing an urgency factor associated with each queue based upon statistical information gathered for the accumulation of data at the associated plurality of thresholds for that queue, the urgency factor representing a relative need for the transmitter associated with each queue to transmit data, and wherein the urgency factor each queue is used to determine the optimum number of channel resources to be allocated to the connections between the transmitter and receiver.

9. The method of claim 1 further including the steps of:

determining how to allocate the available channels among the buffers by determining if the buffer having the highest urgency factor U exceeds a respective high threshold and if the buffer having the lowest urgency factor U exceeds a respective low threshold, and if so, deallocating one resource channel is from the buffer with the lowest urgency factor and reallocating the one resource channel to the buffer with the highest urgency factor.

10. A method for allocating and deallocating channel resources from a limited number of channel resources used to transmit data from a base station transmitter within a network comprising a plurality of base station transmitters to a plurality of subscriber unit receivers, the method comprising the steps of:

storing the data to be transmitted to a particular one of the subscriber unit receivers in a plurality of data queues, there being multiple queues associated with each receiver, and with each queue allocated to handle data traffic having a particular traffic type attribute, the individual queues associated with different transport layer sessions for a given user;

accepting data at a transmit processor within the transmitter, the data arriving from the multiple queues for transmission to the particular receiver;

allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver.

11. A method for allocating and deallocating channel resources from a limited number of channel resources used to transmit data from a base station transmitter within a network comprising a plurality of base station transmitters to a plurality of subscriber unit receivers, the method comprising the steps of:

storing the data to be transmitted to a particular one of the subscriber unit receivers in a plurality of data queues, there being multiple queues associated with each receiver, and with each queue allocated to handle data traffic having a particular traffic type attribute, each one of the plurality of queues having an associated plurality of thresholds, each threshold associated with the level of data stored in that respective queue, the queue thresholds determined from coding rates assigned to the communications channels associated with the link between the transmitter and receiver;

accepting data at a transmit processor within the transmitter, the data arriving from the multiple queues for transmission to the particular receiver;

allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver.

12. A method for allocating and deallocating channel resources from a limited number of channel resources used to transmit data from a base station transmitter within a network comprising a plurality of base station transmitters to a plurality of subscriber unit receivers, the method comprising the steps of:

storing the data to be transmitted to a particular one of the subscriber unit receivers in a plurality of data queues, there being multiple queues associated with each receiver, and with each queue allocated to handle data traffic having a particular traffic type attribute, each one of the plurality of queues having an associated plurality of thresholds, each threshold associated with the level of data stored in that respective queue, the queue thresholds depending upon a round trip transfer time;

accepting data at a transmit processor within the transmitter, the data arriving from the multiple queues for transmission to the particular receiver;

allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver.

13. A method for allocating and deallocating channel resources from a limited number of channel resources used to transmit data from a base station transmitter within a network comprising a plurality of base station transmitters to a plurality of subscriber unit receivers, the method comprising the steps of:

storing the data to be transmitted to a particular one of the subscriber unit receivers in a plurality of data queues, there being multiple queues associated with each receiver, and with each queue allocated to handle data traffic having a particular traffic type attribute, each one of the plurality of queues having an associated plurality of thresholds, each threshold associated with the level of data stored in that respective queue, the queue thresholds depending upon the round trip transfer time and coding rates;

accepting data at a transmit processor within the transmitter, the data arriving from the multiple queues for transmission to the particular receiver;

allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver.

14. A system for wireless communication comprising:

a base station transmitter within a network comprising a plurality of base station transmitters, the base station transmitter having a transmit processor and connected to a wired network;

a plurality of subscriber unit receivers operable for wireless communication with the base station transmitter, a plurality of data queues in the base station transmitter and operable to store data traffic to be transmitted to the subscriber unit receivers, each of the subscriber unit receivers associated with at least one of the data queues, and each of the data queues operable to handle data traffic having a particular traffic type attribute;

a plurality of wireless channels responsive to the transmit processor and operable to transmit data from the data queues to each of the subscriber units; and a channel resource assignor in communication with the transmit processor and operable to assign the channels to the subscriber unit receivers, the channel resource assignor operable to monitor usage of each of the queues to determine an urgency factor indicative of the urgency of the data to be transmitted to the respective subscriber unit receiver of each of the queues, and further operable to determine an optimal number of channels to assign to communication to a particular subscriber unit receiver, the urgency determined from the data traffic corresponding to a plurality of the traffic type attributes include content type.

15. The system as in claim 14 wherein each queue further comprises a plurality of queue thresholds, the thresholds indicative of a level of data in the queue.

16. The system as in claim 15 wherein the queue thresholds are indicative of data underflow.

17. The system as in claim 15 wherein the queue thresholds are indicative of coding rates assigned to the communications channels associated with the link between the transmitter and receiver.

18. The system as in claim 15 wherein the queue thresholds depend upon a round trip transfer time.

19. The system as in claim 15 wherein the queue thresholds depend upon a round trip transfer time and coding rates.

20. The system as in claim 15 wherein the queue thresholds depend upon an expected quality and data rate in the channel.

21. The system of claim 14 wherein the traffic type attribute is also indicative of a transport mechanism type.

22. The system as in claim 21 wherein the transport mechanism type is one of Transmission Control Protocol/Internet Protocol (TCP/IP) and User Datagram Protocol (UDP).

23. The system of claim 14 wherein the content type is one of File Transfer Protocol (FTP) and Hyper Text Transfer Protocol (HTTP).

24. The system as in claim 14 further comprising a plurality of transport layer sessions wherein the individual queues are associated with different transport layer sessions for a given user.

25. The system as in claim 14 wherein the channel resource assignor is further operable to compute an urgency factor associated with each queue based upon statistical information gathered for the accumulation of data at the associated plurality of thresholds for that queue, the urgency factor representing a relative need for the transmitter associated with each queue to transmit data, and wherein the urgency factor each queue is used to determine the optimum number of channel resources to be allocated to the connections between the transmitter and receiver.

26. The system as in claim 14 wherein the channel resource assignor is further operable to determine how to allocate the available channels among the buffers by determining if the buffer having the highest urgency factor U exceeds a respective high threshold and if the buffer having the lowest urgency factor U exceeds a respective low threshold, and if so, deallocating one resource channel is from the buffer with the lowest urgency factor and reallocating the one resource channel to the buffer with the highest urgency factor.

27. A system for managing session queues comprising:
   a base station transmitter within a network comprising a plurality of base station transmitters and having a transmit processor;
   a plurality of subscriber unit receivers operable for wireless communication with the base station transmitter;
   a plurality of session queues in the base station transmitter and operable to store data traffic to be transmitted to the subscriber unit receivers, each of the subscriber unit receivers associated with a plurality of the session queues, the data traffic further comprising packets corresponding to a particular traffic type attribute;
   a plurality of wireless channels responsive to the transmit processor and operable to transmit data from the session queues to each of the subscriber units via a transmit buffer; and
   a channel resource assignor in communication with the transmit processor and operable to assign the channels to the subscriber unit receivers, the channel resource assignor operable to monitor usage of each of the queues to determine an urgency factor indicative of the urgency of the data to be transmitted to the respective subscriber unit receiver of each of the queues, and further operable to determine an optimal number of channels to assign to communication to a particular subscriber unit receiver, the,urgency determined from the data traffic corresponding to a plurality of the traffic type attributes include content type.

28. A computer program product having computer program code for allocating and deallocating channel resources from a limited number of channel resources used to transmit data from a base station transmitter within a network comprising a plurality of base station transmitters to a plurality of subscriber unit receivers, comprising:
   computer program code for storing the data to be transmitted to a particular one of the subscriber unit receivers in a plurality of data queues, there being multiple queues associated with each receiver, and with each queue allocated to handle data traffic having a particular traffic type attribute;
   computer program code for accepting data at a transmit processor within the transmitter, the data arriving from the multiple queues for transmission to the particular receiver;
   computer program code for allocating a number of channel resources to the particular receiver; and
   computer program code for monitoring usage of each of the queues by a channel resource assignor to determine the urgency of data to be transmitted to each queue's respective receiver in order to dynamically assign an optimum number of channel resources to a communication link between the transmitter and receiver, the urgency determined from the data traffic corresponding to a plurality of the traffic type attributes.

29. A system for managing session queues comprising:
   means for storing the data to be transmitted to a particular one of the subscriber unit receivers in a plurality of data queues, there being multiple queues associated with each receiver, and with each queue allocated to handle data traffic having a particular traffic type attribute;
   means for accepting data at a transmit processor within the transmitter, the data arriving from the multiple queues for transmission to the particular receiver;
   means for allocating a number of channel resources to the particular receiver; and
   means for monitoring usage of each of the queues by a channel resource assignor to determine the urgency of data to be transmitted to each queue's respective receiver in order to dynamically assign an optimum number of channel resources to a communication link between the transmitter and receiver, the urgency determined from the data traffic corresponding to a plurality of the attributes include content type.

* * * * *

UNITED STATES PATENT AND TRADEMARK OFFICE
CERTIFICATE OF CORRECTION

PATENT NO.   : 6,542,481 B2
DATED        : April 1, 2003
INVENTOR(S)  : Lawrence R. Foore and James A. Proctor, Jr.

It is certified that error appears in the above-identified patent and that said Letters Patent is hereby corrected as shown below:

Title page,
Item [56], References Cited, U.S. PATENT DOCUMENTS, delete "5,463,629 A 10/1995 Ko" insert -- 5,463,629 A  10/1995 Ko ..........370/110.1 --

Drawings,
Delete FIG. 2 and insert New FIG. 2

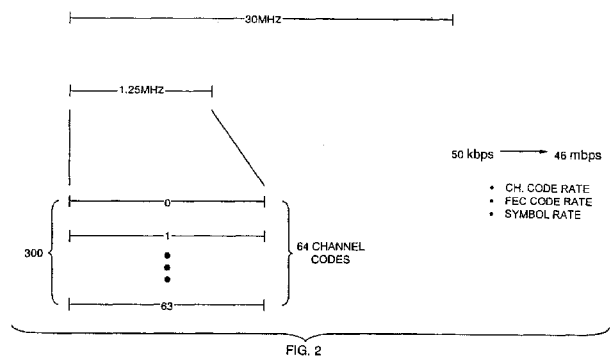

FIG. 2

Delete FIG. 3 and insert New FIG. 3

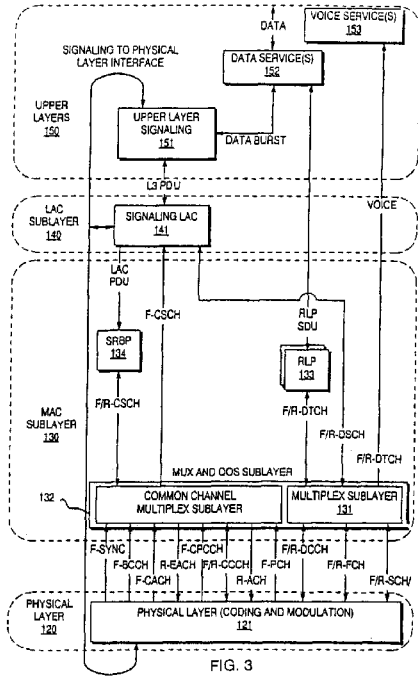

FIG. 3

Column 1,
Line 49, delete "as do provide" insert -- as to provide --

UNITED STATES PATENT AND TRADEMARK OFFICE
CERTIFICATE OF CORRECTION

PATENT NO. : 6,542,481 B2
DATED : April 1, 2003
INVENTOR(S) : Lawrence R. Foore and James A. Proctor, Jr.

It is certified that error appears in the above-identified patent and that said Letters Patent is hereby corrected as shown below:

Column 6,
Line 40, delete "transmitted their" insert -- transmitted to their --

Column 7,
Line 1, delete "132 multiplex" insert -- 132, multiplex --
Line 2, delete "131 radio" insert -- 131, radio --
Line 2 delete: "133 and" insert -- 133, and --

Column 9,
Line 6, delete "(EETF)" insert -- (IETF) --
Line 29, delete "factors-for" insert -- factors for --

Column 13,
Lines 37-43, delete "allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver." insert
-- allocating a number of channel resources to the particular receiver; and
   monitoring usage of each of the queues by a channel resource assignor to determine the urgency of data to be transmitted to each queue's respective receiver in order to dynamically assign an optimum number of channel resources to a communication link between the transmitter and receiver. --

Column 15,
Line 42, delete "the,urgency" insert -- the urgency --

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,542,481 B2                                             Page 1 of 3
DATED        : April 1, 2003
INVENTOR(S)  : Lawrence R. Foore and James A. Proctor, Jr.

It is certified that error appears in the above-identified patent and that said Letters Patent is hereby corrected as shown below:

Title page,
Item [56], References Cited, U.S. PATENT DOCUMENTS, delete "5,463,629 A 10/1995 Ko" insert -- 5,463,629 A 10/1995 Ko .......... 370/110.1 --

Drawings,
Delete FIG. 2 and insert New FIG. 2

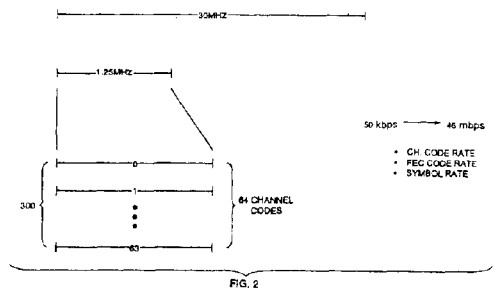

FIG. 2

Delete FIG. 3 and insert new FIG. 3

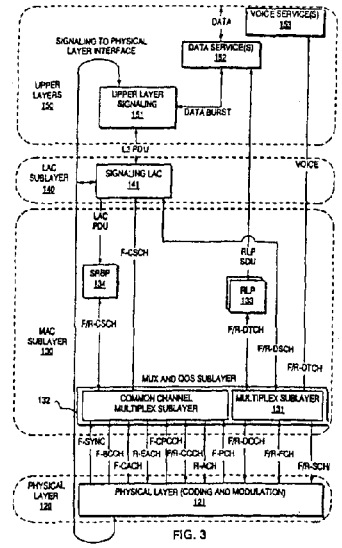

FIG. 3

UNITED STATES PATENT AND TRADEMARK OFFICE
CERTIFICATE OF CORRECTION

PATENT NO.   : 6,542,481 B2
DATED        : April 1, 2003
INVENTOR(S)  : Lawrence R. Foore and James A. Proctor, Jr.

It is certified that error appears in the above-identified patent and that said Letters Patent is hereby corrected as shown below:

Delete FIG. 4 and insert new FIG. 4

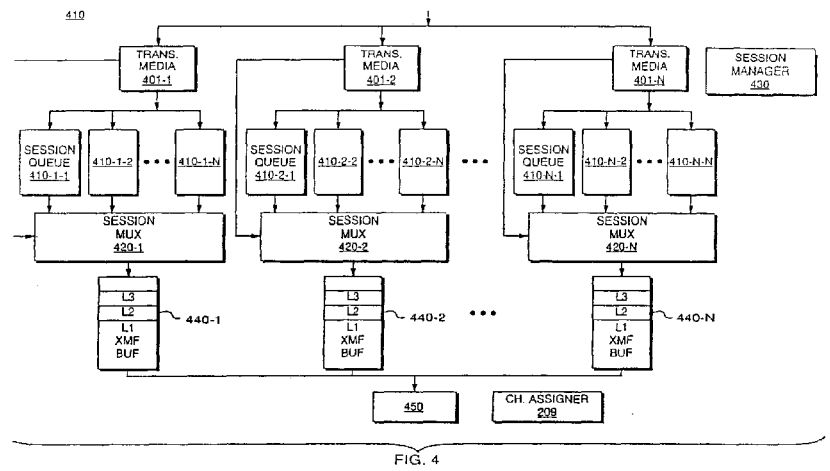

FIG. 4

Column 1,
Line 49, delete "as do provide" insert -- as to provide --

Column 6,
Line 40, delete "transmitted their" insert -- transmitted to their --

Column 7,
Line 1, delete "132 multiplex" insert -- 132, multiplex --
Line 2, delete "131 radio" insert -- 131, radio --
Line 2 delete: "133 and" insert -133, and --

Column 9,
Line 6, delete "(EETF)" insert -- (IETF) --
Line 29, delete "factors-for" insert -- factors for --

UNITED STATES PATENT AND TRADEMARK OFFICE
CERTIFICATE OF CORRECTION

PATENT NO.    : 6,542,481 B2
DATED         : April 1, 2003
INVENTOR(S)   : Lawrence R. Foore and James A. Proctor, Jr.

It is certified that error appears in the above-identified patent and that said Letters Patent is hereby corrected as shown below:

Column 13,
Lines 37-43, delete "allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver." insert -- allocating a number of channel resources to the particular receiver; and monitoring usage of each of the queues by a channel resource assignor to determine the urgency of data to be transmitted to each queue's respective receiver in order to dynamically assign an optimum number of channel resources to a communication link between the transmitter and receiver. --

Column 15,
Line 42, delete "the,urgency" insert -- the urgency --

This certificate supersedes Certificate of Correction issued September 23, 2003.

Signed and Sealed this

Thirtieth Day of December, 2003

JAMES E. ROGAN
*Director of the United States Patent and Trademark Office*